US005665531A

United States Patent [19]

Mutoh et al.

[11] Patent Number: 5,665,531

[45] Date of Patent: Sep. 9, 1997

[54] METHOD OF GELATION OF PHOTOGRAPHIC EMULSIONS, OIL IN WATER EMULSIONS, OR GELATIN SOLUTIONS AND UNIT THEREFOR

[75] Inventors: Kunio Mutoh; Akira Kojima, both of Kanagawa, Japan

[73] Assignee: Fuji Photo Film Co., Ltd., Kanagawa, Japan

[21] Appl. No.: 532,520

[22] Filed: Sep. 22, 1995

[30] Foreign Application Priority Data

Sep. 22, 1994 [JP] Japan .................................... 6-252725

[51] Int. Cl.[6] .......................... G03C 1/015; G03C 1/025; G03C 1/047; B01J 13/00

[52] U.S. Cl. .......................... 430/569; 430/642; 252/312; 252/314; 62/66

[58] Field of Search .................................... 430/569, 642; 252/312, 314; 62/66

[56] References Cited

U.S. PATENT DOCUMENTS

| | | | |
|---|---|---|---|
| 3,810,778 | 5/1974 | Wang | 430/569 |
| 3,847,616 | 11/1974 | Kaneko et al. | 430/642 |
| 3,910,812 | 10/1975 | Kaneko et al. | 159/3 |
| 4,307,055 | 12/1981 | Takeda et al. | 264/178 F |
| 4,539,139 | 9/1985 | Ichikawa et al. | 252/314 |

FOREIGN PATENT DOCUMENTS

| | | |
|---|---|---|
| 52-14717 | 4/1977 | Japan . |
| 60-104937 | 6/1985 | Japan . |
| 3-5210 | 1/1991 | Japan . |
| 3-68735 | 10/1991 | Japan . |

*Primary Examiner*—Mark F. Huff
*Attorney, Agent, or Firm*—Sughrue, Mion, Zinn, Macpeak & Seas

[57] ABSTRACT

A method of gelation of a photographic emulsion, oil in water emulsion, or a gelatin-containing solution comprising continuously rapidly cooling the photographic emulsion, oil in water emulsion, or the gelatin-containing solution, which has good thermal efficiency and requires no adjustment of the amount of water contained in the rapidly cooled product prior to use, and a unit therefor comprising a static mixer-installed double pipe for rapidly cooling the photographic emulsion, oil in water emulsion, or the gelatin-containing solution by a conduction type heat exchange system, and a double pipe without static mixer for conveying the rapidly cooled product to a storage vessel while avoiding adhesion of the rapidly cooled product transformed into a gel state to the inside surface of the inner pipe of the double pipe by warming the inner pipe with water kept at 30° C., although transformation of the rapidly cooled product to a gel state successively proceeds in an inner portion of the inner pipe.

2 Claims, 2 Drawing Sheets

METHOD OF GELATION OF PHOTOGRAPHIC EMULSIONS, OIL IN WATER EMULSIONS, OR GELATIN SOLUTIONS AND UNIT THEREFOR

FIELD OF THE INVENTION

The present invention relates to a method of gelation of a photographic emulsion or oil in water emulsion in a sol state by cooling and a unit therefor.

BACKGROUND OF THE INVENTION

Photographic emulsions, oil in water emulsion, or gelatin solutions in a sol state prepared have hitherto been stored in vessels such as a stainless pot which are placed in a refrigerator in which the emulsions or solutions in a sol state are cooled through thermal conduction from the outside of a vessel to transform into a gel state for storage. In this method the emulsions or solutions in a sol state are compelled to be slowly cooled after being placed in the refrigerator and, as a result, subjected to relatively high temperatures for a long period of time, which is not favorable for photographic properties. For example, in X-ray photographic emulsions in which grains with relatively greater diameters are employed, the grains are precipitated before setting, causing fluctuations in silver distribution. Further, in an oil in water emulsion containing a volatile solvent, the volatile solvent is vaporized and condensed again in a pot which is placed in a refrigerator for storage, developing trouble due to droplets of the solvent.

To solve these problems, a method has been disclosed in JP-B-52-14717 (The term "JP-B" as used herein means an "examined Japanese patent publication"). That is, in a structure having a number of thin wall pipes provided at appropriate intervals in which cold or warmed water is allowed to flow through the outside of the pipes, a photographic emulsion is placed in the thin wall pipes and cooled by circulation of cold water to be transformed into a gel state. In order to take out the gel thus prepared, only the exterior of the gel is then melt again by circulation of warmed water (means 1).

Further, a process of rapid gelation that a sol-form substance is sprinkled in an evacuated vessel to be cooled by absorption of heat of vaporization has been described in U.S. Pat. No. 3,847,616 and U.S. Pat. No. 3,910,812 that are both corresponding to JP-B-50-31447, JP-A-60-104937 (The term "JP-A" as used herein means an "unexamined published Japanese patent application"), JP-B-3-5210, and JP-B-3-68735 (means 2).

The above-mentioned means 1 requires repeating cooling and melting alternately using one vessel, resulting in a hideous waste of time and energy. In means 2, it is difficult to maintain the amount of water contained in an emulsion at a constant value, when the gel prepared is taken out of the vessel for storage. Hence, water must be added to adjust the amount of silver after melting the gel again.

SUMMARY OF THE INVENTION

An object of the present invention is to provide a method of gelation of photographic emulsions, oil in water emulsion, or gelatin solutions comprising continuously rapidly cooling, which has a good thermal efficiency and requires no adjustment of the amount of water contained in the emulsions as mentioned above, and a unit therefor.

The object of the present invention can be accomplished by the following methods and unit:

(1) A method of gelation of photographic emulsions, oil in water emulsion, or gelatin solutions which comprises the steps of continuously rapidly cooling the photographic emulsions, oil in water emulsion, or the gelatin solutions in a sol state to sol-gel transformation point temperatures or lower by the use of a conduction type heat exchange system, and conveying these rapidly cooled products to a storage vessel before transformation to a gel state.

(2) A method of gelation of photographic emulsions, oil in water emulsion, or gelatin solutions which comprises the steps of continuously rapidly cooling the photographic emulsions, oil in water emulsion, or the gelatin solutions in a sol state to sol-gel transformation point temperatures or lower by the use of a conduction type heat exchange system, and continuously conveying these rapidly cooled products before transformation to a gel state to a storage vessel which is cooled to the sol-gel transformation point temperatures or lower, while keeping the outside of a pipe through which the rapidly cooled products are allowed to flow at the sol-gel transformation point temperatures or higher to avoid adhesion of the rapidly cooled products transformed into a gel state to the inside surface of the pipe.

DETAILED DESCRIPTION OF THE INVENTION

Figure 4:
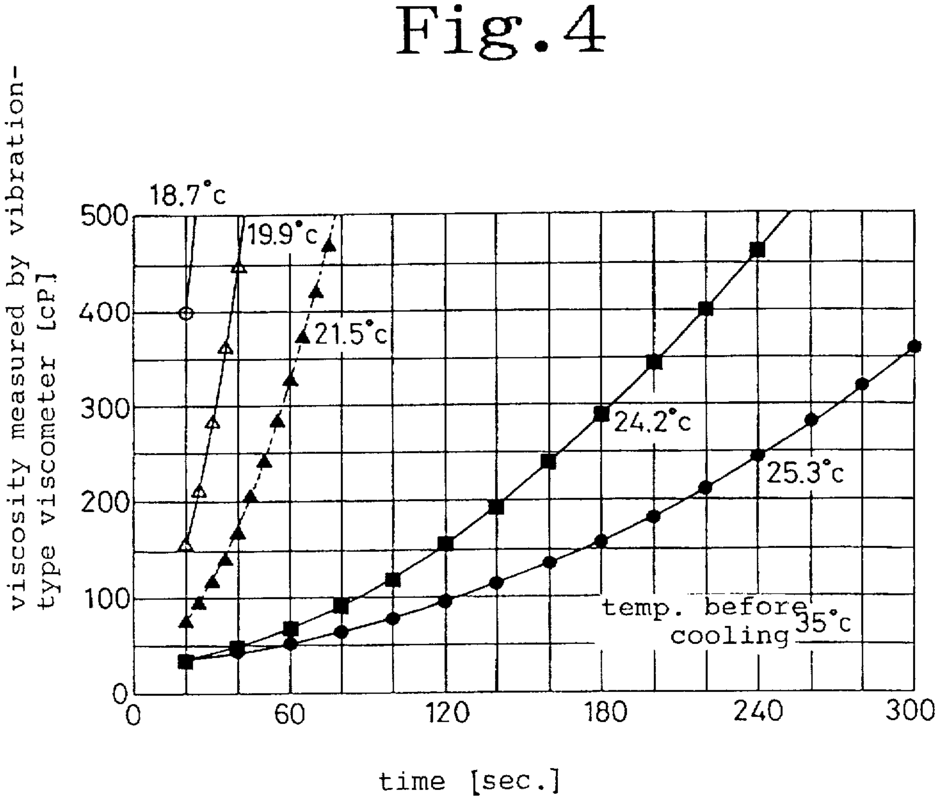
FIG. 4 is graphs of viscosity against sampling time where rises in viscosity were determined with a vibration-type viscometer when a 8% gelatin solution kept at about 35° C. was rapidly cooled to some different temperatures.

The above-mentioned object of the invention has been achieved on the basis of the following principle. That is, photographic emulsions, oil in water emulsion, or gelatin solutions generally contain gelatin as a binder. These gelatin-containing solutions are transformed from a sol state to a gel state in the range of about 24° to 30° C., although the range varies somewhat with the concentration. However, when a gelatin-containing solution kept at a sol-gel transformation point temperature or higher is rapidly cooled to the temperature or lower, the gelatin-containing solution cannot be immediately transformed into a gel state, but generally remains in a sol state for some period of time. FIG. 4 shows a result of determination of viscosity of a 8% gelatin solution with a vibration type viscometer at the outlet of a static mixer-installed double pipe through which the gelatin solution kept previously at about 35° C. is allowed to flow under some different passing time and temperatures. The viscosity is employed as a barometer for gelation. If the gelatin solution is cooled to a sol-gel transformation point temperature or lower and extruded from a heat exchanger before being transformed into a gel state, a gelatin solution in a gel state can be continuously steadily obtained at the sol-gel transformation point temperature or lower without formation of a solid within the heat exchanger or solid build-up on the inside surface thereof. Further, if the gelatin solution still remaining in a sol state which is cooled to the sol-gel transformation point temperature or lower is allowed to flow through a pipe, the outside of which is kept at a sol-gel transformation point temperature or higher, the gelatin solution on the inside surface of the pipe increases temperature to remain in a sol state and can be continuously conveyed to a place for storage without adhesion of the gelatin solution transformed into a gel state to the inside surface of the pipe. A gelatin solution remaining in a sol state which is kept at a sol-gel transformation point temperature or lower is completely transformed into a gel state after the elapse of some time. Hence, if the gelatin solution in a sol state which is cooled to the sol-gel transformation point temperature or lower is allowed to flow at a slower speed through a pipe, the outside of which is kept at the sol-gel transformation point temperature or higher, only the gelatin solution on the inside surface of the pipe increases temperature remains in a sol state without adhesion of a gelatin solution transformed into a gel state to the inside surface, whereas the gelatin solution in the inner portion of the pipe is subjected to complete transformation to a gel state. Thus, the gelatin solution in a gel state can be continuously conveyed to a vessel for storage. Static mixer-installed double pipes (hereinafter referred to as "SM heat exchangers") are most suitably employed as a means of rapid cooling. Examples of other usable heat exchangers include film scraper wall type heat exchangers and multi-pipe type SM exchangers.

In order to recover a gelatin solution staying in an SM heat exchanger at the end of operation, the gelatin solution is replaced by water and the motor is then stopped to wait till the gelatin solution transferred to the double pipe without static mixer is completely transformed into a gel state. The gel thus prepared is thereafter ejected by air pressure to recover the gel with the slightest loss.

Figure 1:
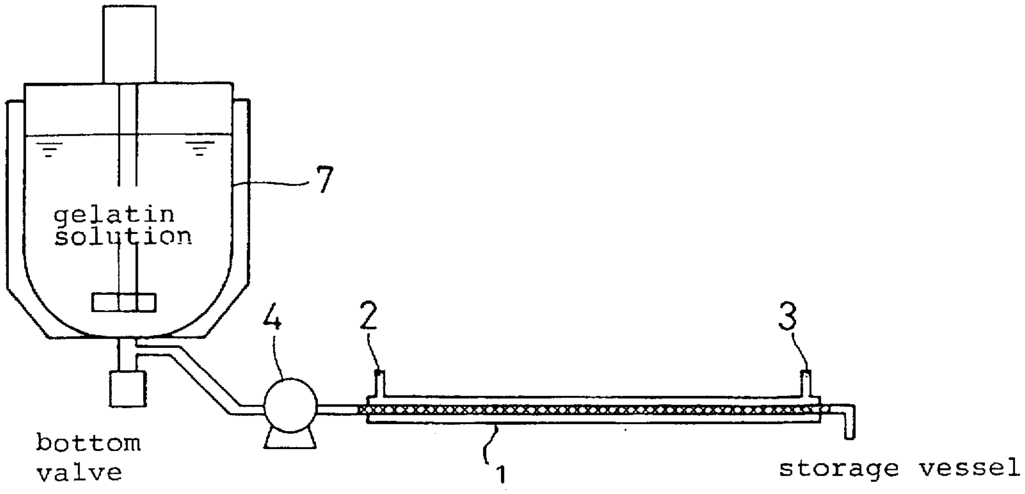
FIG. 1 is a flow sheet of one embodiment of the present invention.

FIG. 1 shows one embodiment of the present invention. SM heat exchanger 1 (inside diameter of the pipe: 10.8 mm, length of the pipe: 2.8 m, thickness of the pipe: 1.5 mm) was used as a means of rapid cooling of a gelatin solution by the use of a conduction-type heat exchange system, which gelatin solution is fed with pump 4 from mixing tank 7.

Figure 2:
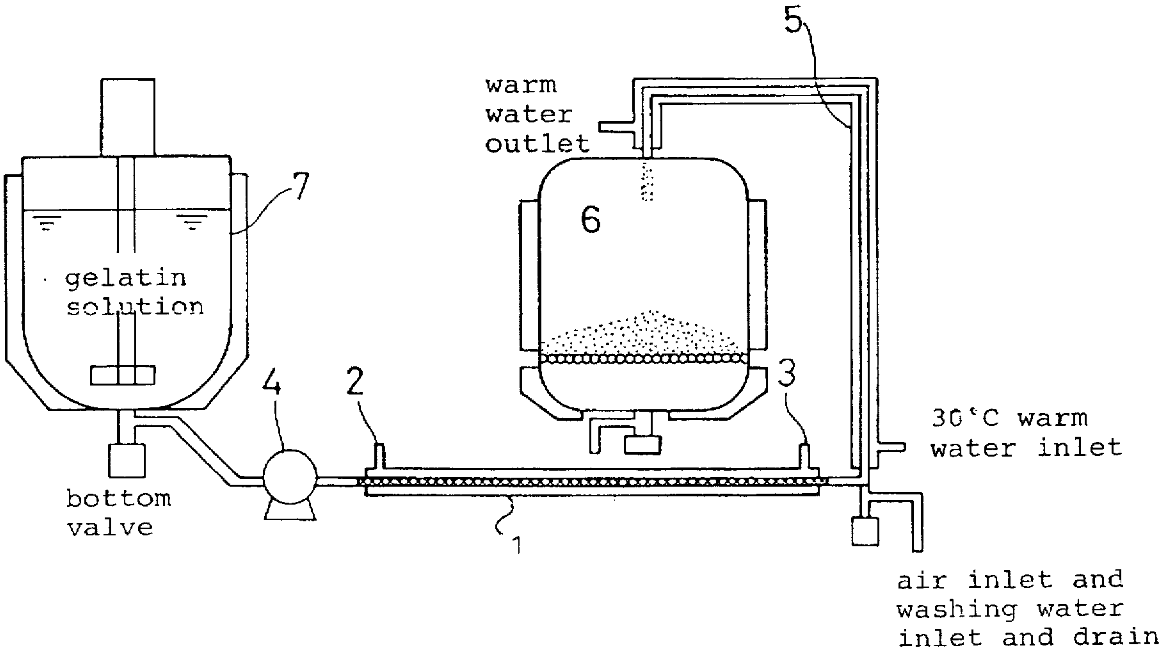
FIG. 2 is a flow sheet of another embodiment of the present invention.

FIG. 2 also shows another embodiment of this invention. A gelatin solution is fed with pump 4 from mixing tank 7 to SM heat exchanger 1 as mentioned above to be subjected to rapid cooling. Successively, the gelatin solution remaining in a sol state which is rapidly cooled to a sol-gel transformation point temperature or lower is allowed to flow through a double pipe 5 without static mixer (inside diameter of the pipe: 10.8 mm, length of the pipe: 23 m) which is warmed with water kept at 30° C., and is conveyed to a storage vessel 6. As the outer pipe of the double pipe is warmed at 30° C., only the gelatin solution on the inside surface of the inner pipe forms a sol state, whereas the gelatin solution in the inner portion thereof is transformed into a gel state with time to solidify. Thus, the inner pipe is not clogged with a solid to convey the whole gelatin solution to storage vessel 6. The gelatin solution conveyed to storage vessel 6, a sol-gel mixture, is completely transformed into a gel state in storage vessel 6 which is cooled to the sol-gel transformation point temperature or lower.

Figure 3:
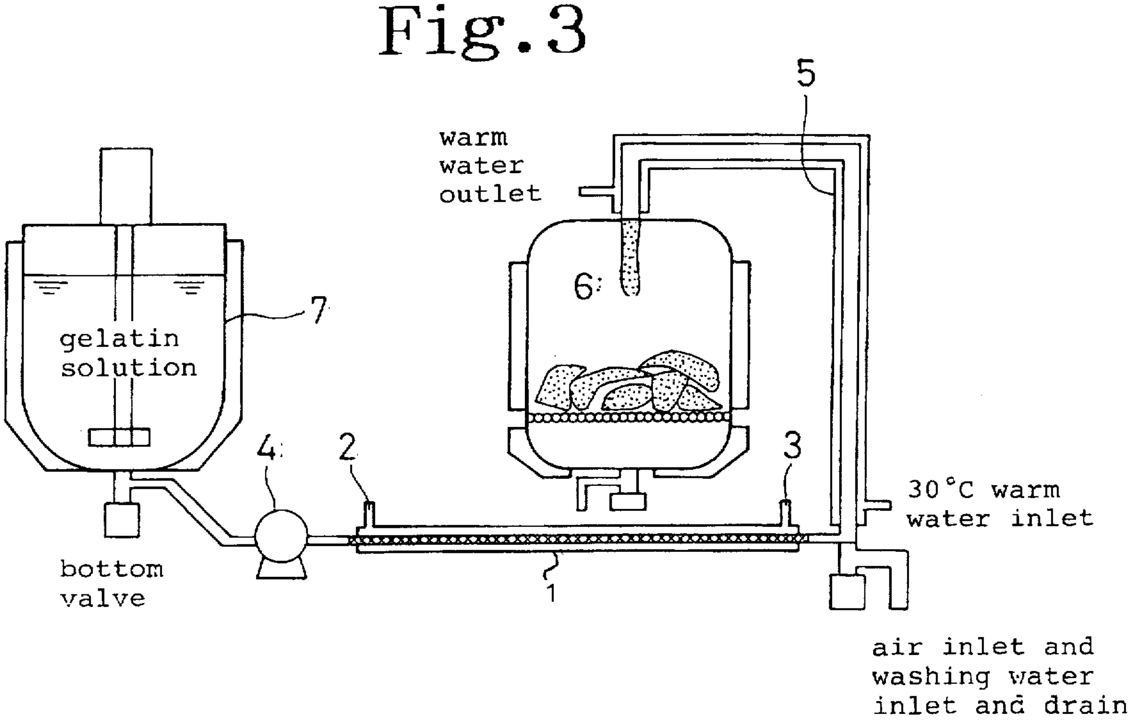
FIG. 3 is a flow sheet of other embodiment of the present invention.

FIG. 3 also shows other embodiment of this invention. A gelatin solution is fed with pump 4 from mixing tank 7 to SM heat exchanger 1 to be subjected to rapid cooling as mentioned above. Successively, the gelatin solution remaining in a sol state which is rapidly cooled to a sol-gel transformation point temperature is allowed to flow through double pipe 5 without static mixer (inside diameter of the pipe: 100 mm, length of the pipe: 2 m) which is warmed with water kept at 30° C. If the gelatin solution stays in double pipe 5 without static mixer for sufficiently long period of time, the gelatin solution is completely transformed into a gel state in the inner portion of the inner pipe and remains in a sol state on the inside surface thereof. Thus, the whole gelatin solution is conveyed to storage vessel 6.

At the end of operation, cooling water in SM exchanger 1 is replaced by water and pump 4 is then stopped to wait till the gelation solution is completely transformed into a gel state in double pipe 5 without static mixer. The gelatin solution completely transformed into a gel state in double pipe 5 without static mixer is thereafter ejected by air pressure to recover the gel with the slightest loss.

EXAMPLE

An adequate amount of cooling water kept at about 5° C. was allowed to flow through the outer pipe of SM heat exchanger 1 from inlet 2 to outlet 3, whereas a 8% gelatin solution was allowed to flow through the inner pipe thereof. Inlet and outlet temperatures of the SM heat exchanger, state at the outlet (sol-gel), and pressure loss in the SM heat exchanger by the use of pump 4 are shown in Table 1.

TABLE 1

| | Gelatin Solution | | | | | |
|---|---|---|---|---|---|---|
| | Flow | Temperature | | Residence Time in SM Heat | State | Pressure Loss in SM Heat |
| Level No. | Rate (l/min) | Inlet (°C.) | Outlet (°C.) | Exchanger (sec) | at Outlet | Exchanger ($kg/cm^2$) |
| 1 | 8.16 | 35.1 | 24.3 | 1.9 | sol | 15.0 |
| 2 | 5.71 | 34.8 | 20.9 | 2.7 | sol | 8.2 |
| 3 | 2.83 | 35.1 | 17.9 | 5.4 | sol | 3.2 |
| 4 | 1.68 | 34.9 | 17.6 | 9.2 | sol | 2.2 |
| 5 | 0.92 | 34.7 | 17.1 | 16.7 | semigel | 2.6 |
| 6 | 0.46 | 34.7 | transformed into a gel state in the SM heat exchanger so that the pipe was clogged with solid | | | |

When the temperature of a 8% gelatin solution at the outlet of the SM heat exchanger is about 25° C. or lower as shown in Table 1, the viscosity of the gelatin solution increases with time and the gelatin solution is finally transformed into a gel state. Therefore, operation conditions of levels 1 to 5 in Table 1 correspond to those under which the object of the present invention can be achieved. However, in level 6, too long residence time causes the gelatin solution to be transformed into a gel state within the SM heat exchanger and inhibit the gelatin solution from flowing from the outlet thereof. Hence, the operation conditions of level 6 is not favorable.

The method and unit of the present invention make it possible to rapidly cool and continuously transform photographic emulsions, oil in water emulsion, or gelatin solutions into a gel state with good thermal efficiency. This method requires no adjustment of the amount of water contained in emulsions prior to use.

Photographic emulsions and oil in water emulsion can be stored with the slightest loss by ejecting a solidified product from the pipe at the end of operation as mentioned above.

Photographic emulsions and oil in water emulsion can be free of bubbles, if they are conveyed to the storage vessel after being completely transformed into a gel state as shown in the embodiment in FIG. 3.

While the invention has been described in detail and with reference to specific embodiments thereof, it will be apparent to one skilled in the art that various changes and modifications can be made therein without departing from the spirit and scope thereof.

What is claimed is:

1. A method of gelation of a photographic emulsion, oil in water emulsion containing gelatin, or a gelatin solution which comprises the steps of continuously rapidly cooling the photographic emulsion, oil in water emulsion, or the gelatin solution in a sol state to a sol-gel transformation point temperature or lower by a conduction heat exchange system to obtain a rapidly cooled product, and conveying said rapidly cooled product to a storage vessel before transformation to a gel state.

2. A method of gelation of a photographic emulsion, oil in water emulsion containing gelatin, or a gelatin solution which comprises the steps of continuously rapidly cooling the photographic emulsion, oil in water emulsion, or gelatin solution in a sol state to a sol-gel transformation point temperature or lower by a conduction heat exchange system to obtain a rapidly cooled product, and continuously conveying said rapidly cooled product through a pipe to a storage vessel cooled to the sol-gel transformation point temperature or lower before transformation to a gel state while keeping the outside of the pipe at the sol-gel transformation point temperature or higher to avoid adhesion of said rapidly cooled product being transformed into a gel state to the inside surface of the pipe.

* * * * *